United States Patent [19]

Swoboda

[11] Patent Number: 4,890,701
[45] Date of Patent: Jan. 2, 1990

[54] FIVE-RIB DISK BRAKE ROTOR

[75] Inventor: James J. Swoboda, Platte Center, Nebr.

[73] Assignee: International Wholesale, Inc., Yankton, S. Dak.

[21] Appl. No.: 272,347

[22] Filed: Nov. 17, 1988

[51] Int. Cl.⁴ .................. F16D 65/10; A63C 17/12
[52] U.S. Cl. ................ 188/218 XL; 301/6 R
[58] Field of Search ......... 188/18 A, 218 XL, 264 A, 188/264 AA; 301/5 B, 6 WB, 6 E, 6 R; 74/573 R, 574; D12/204, 207, 180

[56] References Cited

U.S. PATENT DOCUMENTS 2,629,464  2/1953  Helsten ................ 188/218 XL
4,319,785  3/1982  Sato et al. ............. 301/6 E X

FOREIGN PATENT DOCUMENTS 0708083  4/1954  United Kingdom ......... 188/218 XL

Primary Examiner—Robert J. Oberleitner
Attorney, Agent, or Firm—Zarley, McKee, Thomte, Voorhees & Sease

[57] ABSTRACT

An improved rotor includes an inner body having a center aperture and peripheral rim. Five evenly-spaced bolt apertures are located in the forward face of the inner body and equidistant from the center aperture. Five ribs extend radially inwardly from the peripheral rim and are evenly spaced intermediate the bolt apertures. Each rib is also located so as to be diametric to a bolt aperture.

2 Claims, 2 Drawing Sheets

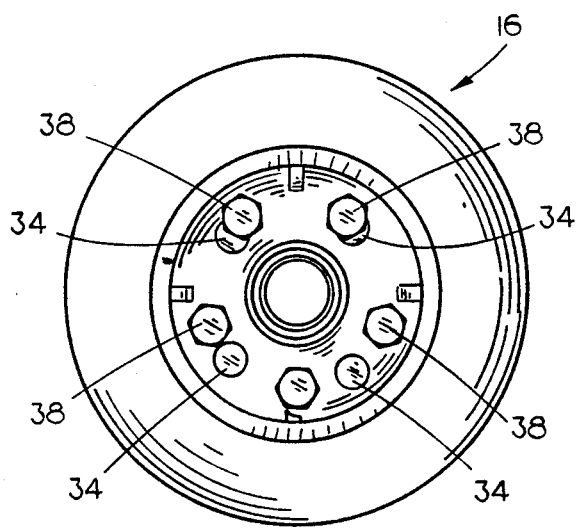
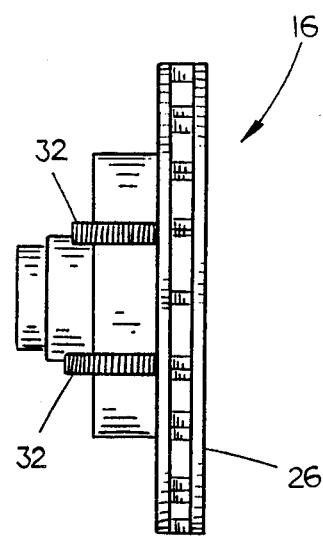
FIG. 5
(PRIOR ART)
FIG. 6
(PRIOR ART)
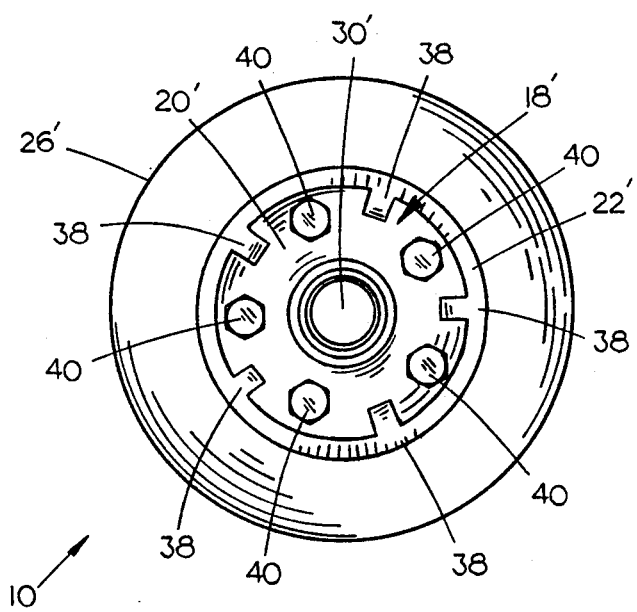
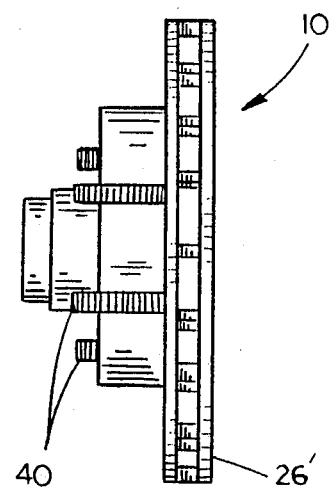
FIG. 7
FIG. 8

4,890,701

FIVE-RIB DISK BRAKE ROTOR

TECHNICAL FIELD

This invention relates generally to rotors utilized for retaining a wheel, and more particularly to an improved five-bolt rotor.

BACKGROUND OF THE INVENTION

One method currently utilized to modify a car to be a "hot rod", is to convert the four-bolt rotors conventionally utilized to a five-bolt rotor. In order to provide the desired five-bolt rotor, a four-bolt rotor is modified by first removing the four bolts, then installing plugs in the bolt holes, grinding off one of the four ribs of the rotor, and finally drilling five new bolt holes.

Clearly, this method of modifying a four-bolt rotor is expensive, and requires specialized tools and procedures. Furthermore, modification of an existing rotor is undesirable since the modified rotor has a decreased strength due to this modification. The grinding of one of the four ribs also throws the rotor slightly out of balance, which can be difficult to correct.

It is therefore a general object of the present invention to provide an improved rotor having five bolts.

Another object of the present invention is to provide a five-bolt rotor having a structural integrity greater than a modified four-bolt rotor.

A further object of the present invention is to provide a five-bolt rotor which does not utilize plug inserts, nor require the removal of a rib.

Yet another object is to provide a five-bolt rotor which is inherently balanced at the manufacture thereof.

These and other objects of the present invention will be apparent to those skilled in the art.

SUMMARY OF THE INVENTION

The improved rotor of this invention includes a conventional inner body with a peripheral rim, and a double-flange assembly for use with vehicle brakes. Five evenly spaced bolt apertures are located at a predetermined radius from the center aperture of the inner body. Five ribs are formed intermediate the bolt apertures and spaced evenly therebetween to provide increased strength Each rib is also located so as to be diametric to a bolt aperture.

BRIEF DESCRIPTION OF THE DRAWINGS

FIG. 5 is a front elevational view of a four-bolt rotor which has been modified to a five-bolt rotor;

FIG. 6 is a side view of a conventional four-bolt rotor;

FIG. 7 is a front elevational view of the five-bolt rotor of this invention; and FIG. 8 is a side view of the five-bolt rotor of this invention.

DESCRIPTION OF THE PREFERRED EMBODIMENT

Figure 1:
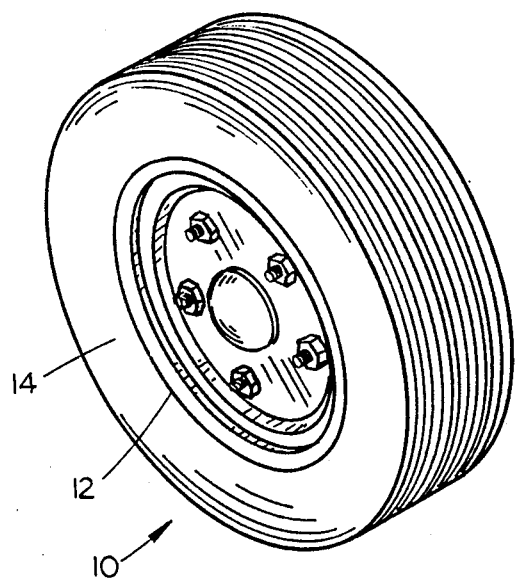
FIG. 1 is a perspective view of the five-bolt rotor of this invention with a wheel and tire mounted thereon.
Figure 2:
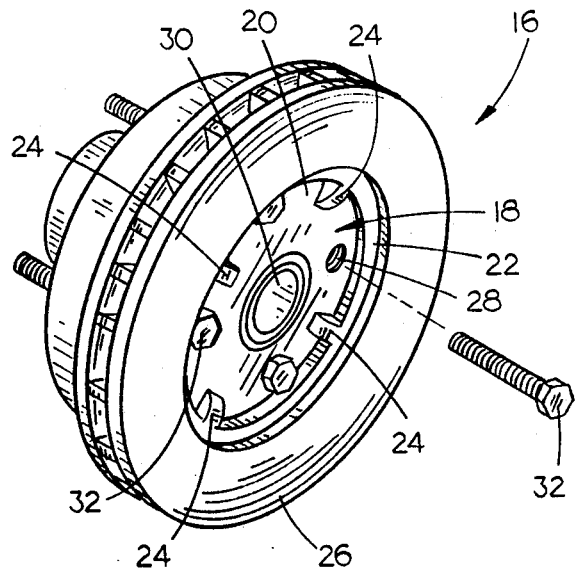
FIG. 2 is a perspective view of a four-bolt rotor of the prior art.
Figure 3:
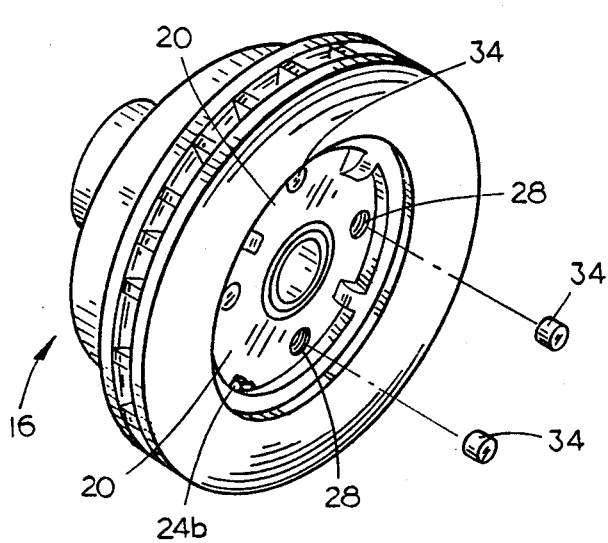
FIG. 3 is a perspective view of a four-bolt rotor with modifications thereto shown in exploded schematic view.

Referring now to the drawings in which identical or corresponding parts are identified with the same reference numeral, and more particularly to FIG. 1, the five-bolt rotor of this invention is designated generally at 10 and is shown with a wheel 12 and tire 14 mounted thereon.

FIGS. 2–6 show a four-bolt rotor through the various stages of modification to form a five-bolt rotor as known in the prior art. The four-bolt rotor is designated generally at 16 and includes a generally cylindrical inner body 18 having a forward face 20 and a peripheral ring 22 with four ribs 24 extending radially inwardly from peripheral ring 22. Each rib 24 is located diametric to another rib 24. A double flange 26 is mounted to inner body 18 and provides surfaces for the vehicle's brake system. Rotor 16 includes four apertures 28 evenly spaced between ribs 24 and radially spaced from center apertures 30. Each aperture 28 is also located diametric to another aperture 28. Four bolts 32 are mounted through bolt apertures 28 and serve for mounting a wheel on to rotor 16.

The first step in modifying rotor 16 to form a five-bolt rotor, is to remove bolts 32 and provide plug inserts 34. Plug inserts 34 are permanently mounted in apertures 28 so as to provide a continuous front face 20. It is also necessary to grind away a major portion of one rib 24b such that the five new apertures to be drilled may be evenly spaced around front face 20 of rotor 16. As discussed above, one problem with grinding off a portion of one rib, is that it will throw rotor 16 slightly out of balance.

Figure 4:
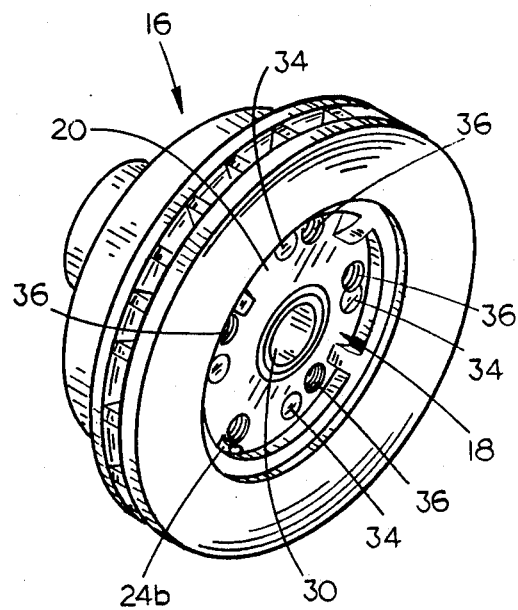
FIG. 4 is a perspective view of a four-bolt rotor which has been converted to a five-bolt rotor.

FIG. 4 shows rotor 16 with all four plug inserts mounted in place, and five new apertures 36 drilled through forward face 20 of inner body 18. Newly drilled apertures 36 are spaced equidistant radially from center apertures 30 and are also spaced evenly from each other. FIG. 5 is a front view of the modified rotor 16 with five bolts 38 installed thereon. FIG. 6 is a side view of a conventional four-bolt rotor. The plug inserts 34 can be seen in this view.

FIG. 7 is a front elevational view of the new five-bolt rotor 10 of this invention. Five-bolt rotor 10 is formed with an inner body 18' having a forward face 20' and a peripheral ring 22'. Rotor 10 is formed with five equally-spaced ribs 38, rather than the four ribs conventionally known four-bolt rotors 16. Similar to the four-bolt version, rotor 10 includes a double flange assembly 26' for use with the brake system of the vehicle, as well as a center aperture 30'. The openings for the five bolts 40 are arranged evenly around center aperture 30' and equidistant therefrom. Furthermore, each bolt 40 is located diametric to a rib 38 and located intermediate two ribs 38. This arrangement has been found to be superior in strength to a modified four-bolt rotor 16. It is believed this is caused by three major features: (1) the use of more ribs 38; (2) the elimination of plug inserts; and (3) the arrangement of the five bolts each being diametric to a rib and evenly spaced between a pair of ribs.

Whereas the invention has been shown and described in connection with the preferred embodiment, it will be understood that many modifications, substitutions and additions may be made which are within the intended broad scope of the appended claims. For example, the size and materials used in rotor 10 may be of any type commonly utilized in brake rotors. Thus, it can be seen that the present invention fulfills at least all of the above-stated objectives.

I claim:

1. In combination;
a disk brake rotor having a generally cylindrical inner body with a solid forward face and a center longitudinal aperture oriented perpendicularly to said face;
a peripheral ring extending forwardly from said face;
a double-flange assembly projecting radially from said inner body;
five rib portions projecting radially inwardly from said peripheral ring, and evenly-spaced therealong;
said inner body having five bolt holes therethrough parallel to said center aperture and equidistant therefrom, said bolt holes being arranged on the front face of said inner body equally spaced from each other and equidistant from said center aperture, and located such that each bolt hole is equidistant between two adjacent rib portions and diametric to another of said rib portions.

2. In combination:
a disk brake rotor having a generally cylindrical inner body with a solid forward face and a center longitudinal aperture oriented perpendicularly to said face;
a peripheral ring extending forwardly from said face;
a double-flange assembly projecting radially from said inner body;
five rib portions projecting radially inwardly from said peripheral ring, and evenly-spaced therealong;
said rib portions, peripheral ring and inner body being a single integral unit formed in a single casting;
said inner body being further characterized as having five bolt holes therethrough parallel to said center aperture and equidistant therefrom, said bolt holes being arranged on the front face of said inner body equally spaced from each other and equidistant from said center aperture, and located such that each bolt hole is equidistant between two adjacent rib portions and diametric to another of said rib portions.

* * * * *